United States Patent
Wu et al.

(10) Patent No.: US 9,535,290 B2
(45) Date of Patent: Jan. 3, 2017

(54) PARALLAX BARRIER AND DISPLAY DEVICE

(71) Applicant: BOE Technology Group Co., Ltd., Beijing (CN)

(72) Inventors: Yanbing Wu, Beijing (CN); Hongjun Xie, Beijing (CN)

(73) Assignee: BOE TECHNOLOGY GROUP CO., LTD, Beijing (CN)

(*) Notice: Subject to any disclaimer, the term of this patent is extended or adjusted under 35 U.S.C. 154(b) by 10 days.

(21) Appl. No.: 13/961,395

(22) Filed: Aug. 7, 2013

(65) Prior Publication Data
US 2014/0043573 A1    Feb. 13, 2014

(30) Foreign Application Priority Data
Aug. 10, 2012    (CN) .......................... 2012 1 0285323

(51) Int. Cl.
*G02F 1/1337* (2006.01)
*G02F 1/1343* (2006.01)
*H04N 13/04* (2006.01)

(52) U.S. Cl.
CPC ... *G02F 1/133707* (2013.01); *G02F 1/134363* (2013.01); *H04N 13/0409* (2013.01); *G02F 2001/134372* (2013.01)

(58) Field of Classification Search
CPC .............. G02F 2001/134372; G02F 1/133707; G02F 1/134363; G02F 2001/134381; H04N 13/0409; H04N 13/0411; H04N 13/0415; H04N 13/0418; H04N 13/042
See application file for complete search history.

(56) References Cited

U.S. PATENT DOCUMENTS 8,045,070 B2    10/2011 Park et al.
8,659,586 B2    2/2014 Kadowaki
(Continued)

FOREIGN PATENT DOCUMENTS

| CN | 1976483 A | 6/2007 |
|---|---|---|
| CN | 101533169 B | 3/2011 |
| CN | 102213869 A | 10/2011 |
| CN | 102591090 A | 7/2012 |
| CN | 102628997 A | 8/2012 |
| JP | 2011169949 A | 9/2001 |
| JP | 2011013575 A | 1/2011 |
| JP | 2011169949 A | 9/2011 |
| KR | 10-0707609 | 4/2007 |
| KR | 10-2007-0070381 | 7/2007 |

OTHER PUBLICATIONS

Communication issued by the European Patent Office on Dec. 3, 2013 regarding Application No. 13179730.0-1904, 9 pages.
(Continued)

*Primary Examiner* — Dennis Y Kim (57) ABSTRACT

Embodiments of the invention provide a parallax barrier and a display device. The parallax barrier comprises: first and second substrates; liquid crystal, filled between the two substrates; a plurality of strip-like electrode units, disposed parallel to each other and at an interval on a side of the first substrate close to the liquid crystal; a first alignment layer, disposed above the strip-like electrode units; a second alignment layer, disposed on a surface of the second substrate opposed to the first substrate, wherein, a aligning direction of the first alignment layer is perpendicular to an extending direction of the strip-like electrode units, and aligning directions of the first and second alignment layer are opposite, wherein, after the strip-like electrode units are energized, the liquid crystal directly above the strip-like electrode units are rotated by an angle ranged from 85° to 95° in a plane parallel to the substrates.

6 Claims, 5 Drawing Sheets

(56) References Cited

U.S. PATENT DOCUMENTS

| | | | |
|---|---|---|---|
| 8,665,383 B2 | 3/2014 | Lee et al. | |
| 2007/0120768 A1 | 5/2007 | Lee et al. | |
| 2007/0126967 A1* | 6/2007 | Choi et al. | 349/141 |
| 2007/0152998 A1* | 7/2007 | Ahn et al. | 345/419 |
| 2008/0225194 A1* | 9/2008 | Harada | G02F 1/136227 349/46 |
| 2009/0002267 A1 | 1/2009 | Nam et al. | |
| 2010/0110316 A1* | 5/2010 | Huang et al. | 349/15 |
| 2011/0001894 A1* | 1/2011 | Owaku et al. | 349/15 |
| 2012/0194495 A1* | 8/2012 | Kadowaki | 345/208 |
| 2013/0127831 A1* | 5/2013 | Kim | H04N 13/0409 345/419 |

OTHER PUBLICATIONS

English translation of CN1976483(A), listed above, 31 pages.
English translation of JP2011169949(A), listed above, 17 pages.
English translation of CN101533269(B), listed above, 12 pages.
English translation of CN102213859(A), listed above, 28 pages.
English translation of CN102628997(A), listed above, 31 pages.
English translation of CN102591090(A), listed above, 17 pages.
Office Action issued by the Korean Patent Office for Korean Patent Application No. 10-2013-0094622 dated Jul. 15, 2014, 5pgs.
English translation of Office Action issued by the Korean Patent Office for Korean Patent Application No. 10-2013-0094622 dated Jul. 15, 2014, 4pgs.
English abstract of JP2011013575A, listed above, 1 page.
Office Action and Examination Opinion (Korean language) issued by the Korean Intellectual Propery Office ("KIPO") on Jan. 27, 2015 for International Application No. 10-2013-0094622, 5 pages.
English translation of Office Action and Examination Opinion issued by KIPO (listed above) on Jan. 27, 2015 for International Application No. 10-2013-0094622, 4 pages.
Examination Opinion (Korean language) issued by the Korean Intellectual Property Office, for Korean patent application No. 10-2013-0094622, dated Aug. 27, 2015; 3 pages.
English translation of Examination Opinion issued by the Korean Intellectual Property Office, for Korean patent application No. 10-2013-0094622, dated Aug. 27, 2015; 2 pages.

* cited by examiner

PARALLAX BARRIER AND DISPLAY DEVICE

CROSS REFERENCE TO RELATED APPLICATIONS

This application claims priority from Chinese National Application No. 201210285323.0 filed on Aug. 10, 2012, the contents of which are incorporated herein by reference.

TECHNICAL FIELD

Embodiments of the present invention relate to a parallax barrier and a display device comprising the parallax barrier.

BACKGROUND

The hypostasis of the 3D display is to produce stereoscopy with a parallax, namely, to make a left-eye image be seen by the left eye of a person, and a right-eye image be seen by his right eye. Where, the left-eye and right-eye images are a pair of stereoscopic images having a parallax. Current 3D display technologies can be mainly classified into a glasses mode and a naked-eye mode. As regards the glasses mode 3D display technology, it is inevitable that a user has to wear glasses, and long-time watching will fatigue eye and will degrade the comfort level of watching. The naked-eye mode 3D technology does not require a user to wear glasses, and will become a mainstream of the 3D display technology in the future.

Figure 1:
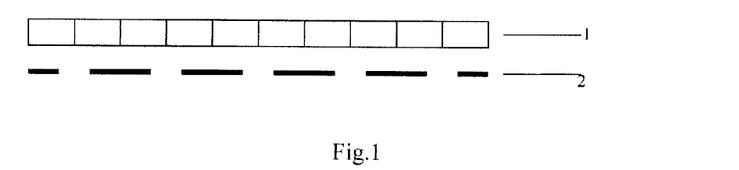
FIG. 1 is a structurally schematic view showing an existing naked-eye 3D display device with a parallax barrier.

A parallax barrier method is a naked-eye 3D display technology that is commonly used, and as shown in FIG. 1, a naked-eye 3D display device with a parallax barrier includes a display unit 1 and a parallax barrier 2 disposed in correspondence with the display unit 1. The parallax barrier 2 is an optical device with periodically arranged light transmitting and light shielding stripes.

Figure 2:
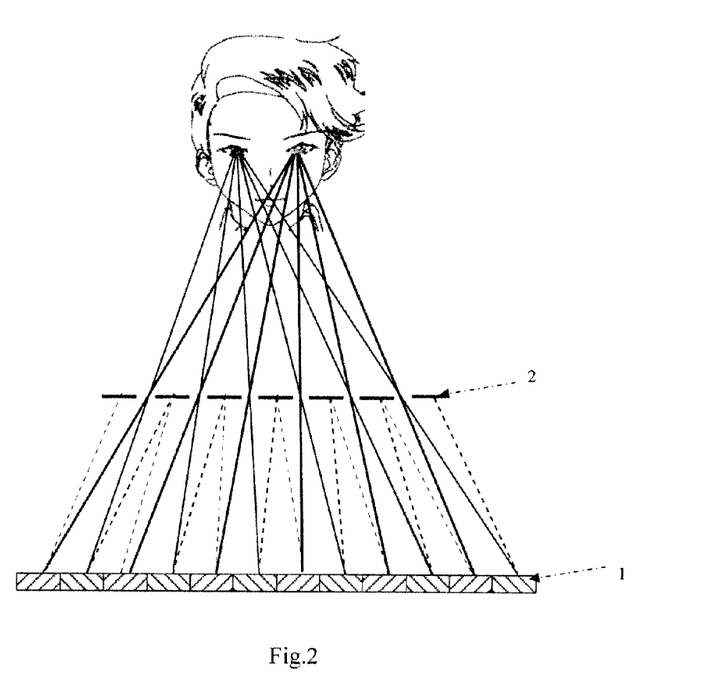
FIG. 2 is a schematic view showing the principle of the 3D display device shown in FIG. 1.

The display principle of the parallax barrier 2 is shown in FIG. 2. The display unit 1 is classified into two portions, i.e., pixels denoted by left-oblique lines, with which a right-eye image is displayed, and pixels denoted by right-oblique lines, with which a left-eye image is displayed, and one parallax barrier 2 is placed between the display unit 1 and a viewer. Light shielding regions of the parallax barrier 2 will be used to shield the right-eye image for the left eye of the viewer, and to shield the left-eye image for his right eye, so that the viewer sees merely the left-eye image with the left eye and sees merely the right-eye image with the right eye through light transmitting regions. Thereby, a 3D effect is attained.

In order to realize the 2D/3D switch, a liquid crystal slit grating is usually employed as the parallax barrier. The liquid crystal slit grating generally adopts a liquid crystal panel of a TN mode (namely, a liquid crystal mode for nematic liquid crystals in which the twisted angle of liquid crystal molecules is 90 degrees). When being energized, the liquid crystal slit grating turns to be a slit grating with alternating light transmitting and light shielding stripes, so that the 3D display can be achieved; and when being not energized, the liquid crystal slit grating is pervious to light as a whole, so that the 2D display can be conducted.

Figure 3:
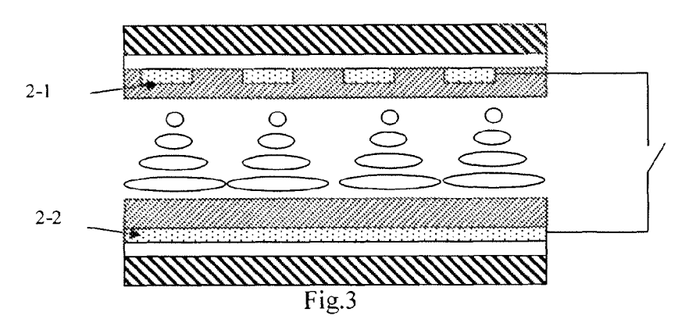
FIG. 3 is a structurally schematic view showing an existing liquid crystal slit grating.
Figure 4:
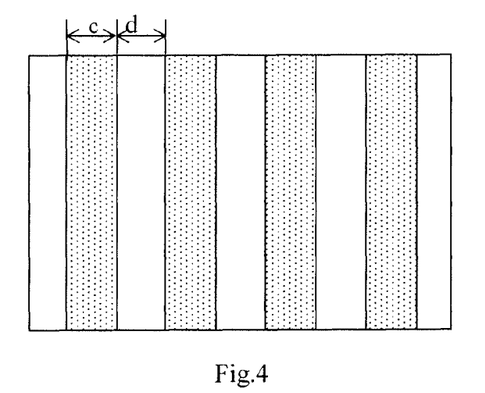
FIG. 4 shows a pattern of a transparent electrode on an upper substrate of the liquid crystal slit grating shown in FIG. 3.

FIG. 3 is a structurally schematic view showing a liquid crystal slit grating in prior art. The liquid crystal slit grating includes two substrates (upper and lower substrates) and liquid crystal filled between the two substrates. On a lower surface of its upper substrate, a plurality of transparent electrodes 2-1, which are arranged separately with a certain distance therebetween, are provided, and on an upper surface of the lower substrate, a whole layer of transparent electrode 2-2 is provided in correspondence with the transparent electrodes 2-1. As shown in FIG. 4, provided that a width of a light shielding region of the liquid crystal slit grating is c, and a width of a light transmitting region is d, then a width of each of the transparent electrodes 2-1 on the lower surface of the upper substrate is usually c, and an interval between adjacent transparent electrodes 2-1 is d.

In the course of fabricating such a parallax barrier, it is necessary that on each of the two substrates, a transparent electrode be deposited one time, and exposure, development and etching be conducted at least one time, so as to form a pattern shown in FIG. 4. Thus, the fabrication cost is relatively high. Furthermore, because two transparent electrodes are formed on two substrates, respectively, a anisotropic conductive adhesive is required to electrically communicate the transparent electrode formed on one of the two substrates with a leading wire on the other of the two substrates, and thus, the fabrication cost is further increased.

SUMMARY

According to embodiments of the invention, there are provided a parallax barrier with a lower fabrication cost and a display device comprising the parallax barrier.

In an aspect, embodiments of the invention provide a parallax barrier, comprising: a first substrate; a second substrate, cell-assembled with the first substrate; liquid crystal, filled between the first substrate and the second substrate; a plurality of strip-like electrode units, disposed parallel to each other and at an interval on a side of the first substrate close to the liquid crystal; a first alignment layer, disposed above the plurality of strip-like electrode units and on the side of the first substrate close to the liquid crystal; a second alignment layer, disposed on a surface of the second substrate opposed to the first substrate, wherein, a aligning direction of the first alignment layer is perpendicular to an extending direction of the strip-like electrode units, and a aligning direction of the second alignment layer is opposite to the aligning direction of the first alignment layer, wherein, after the strip-like electrode units are energized, the liquid crystal directly above the strip-like electrode units are rotated by an angle ranged from 85° to 95° in a plane parallel to the substrates.

Optionally, each of the plurality of strip-like electrode units includes a first transparent electrode and a second transparent electrode to which different voltages are applied, and at least one of the first transparent electrode and the second transparent electrode comprises a plurality of strip-like transparent electrodes electrically connected to each other, extending directions of which are the same as the aligning direction of the first alignment layer or forms a preset angle with the aligning direction of the first alignment layer.

Optionally, the first transparent electrode and the second transparent electrode that are included in each of the strip-like electrode units are disposed in the same layer.

Optionally, the first transparent electrode and the second transparent electrode that are included in each of the strip-like electrode units are disposed in different layers, and an insulating layer is provided between the first transparent electrode and the second transparent electrode.

Optionally, each of the first transparent electrode and the second transparent electrode comprises a plurality of strip-like transparent electrodes electrically connected to each other, extending directions of which are the same as the aligning direction of the first alignment layer or forms a preset angle with the aligning direction of the first alignment layer, and in the same one of the strip-like electrode units, the plurality of strip-like transparent electrodes for the first transparent electrode and the plurality of strip-like transparent electrodes for the second transparent electrode are disposed parallel to each other and alternately.

Optionally, each of the first transparent electrode and the second transparent electrode comprises a plurality of strip-like transparent electrodes electrically connected to each other, extending directions of which are the same as the aligning direction of the first alignment layer or forms a preset angle with the aligning direction of the first alignment layer, the extending direction of the strip-like transparent electrodes for the first transparent electrode and the extending direction of the strip-like transparent electrodes for the second transparent electrode are the same, and in the same one of the strip-like electrode units, each of the strip-like transparent electrodes for the first transparent electrode is located in a region corresponding to a gap between two adjacent strip-like transparent electrodes for the second transparent electrode.

Optionally, the first transparent electrode comprises a plurality of strip-like transparent electrodes electrically connected to each other, extending directions of which are the same as the aligning direction of the first alignment layer or forms a preset angle with the aligning direction of the first alignment layer, the second transparent electrode is a plate-like electrode and is closer to the first substrate than the first transparent electrode, and the second transparent electrodes of the plurality of strip-like electrode units are formed into a whole.

Embodiments of the invention further provide a display device, comprising: a display panel; and the parallax barrier as stated above, which is disposed on a light exiting side of the display panel or is located between the display panel and a backlight.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, a parallax barrier and a display device comprising the parallax barrier, which are proposed by embodiments of the invention, will be described in detail in conjunction with accompanied drawings.

The parallax barrier according to embodiments of the invention comprises: a first substrate; a second substrate that is cell-assembled with the first substrate; liquid crystal that is filled between the first substrate and the second substrate; a plurality of strip-like electrode units, which are disposed parallel to each other and at an interval on a side of the first substrate close to the liquid crystal; a first alignment layer, which is disposed above the plurality of strip-like electrode units and on the side of the first substrate close to the liquid crystal; a second alignment layer, which is disposed on a surface of the second substrate opposed to the first substrate, wherein, a aligning direction of the first alignment layer is perpendicular to an extending direction of the strip-like electrode units, and a aligning direction of the second alignment layer is opposite to the aligning direction of the first alignment layer. As shown in FIG. 5 to FIG. 8, a long-strip area A that is separated from a adjacent long-strip area at a predetermined distance b is a strip-like electrode unit with a width of a, as such, the aligning direction of the first alignment layer is along an arrow direction shown in FIG. 5 to FIG. 8 or along an opposite direction of the arrow direction, and aligning directions of the second alignment layer and the first alignment layer are opposite. Furthermore, after the strip-like electrode units are energized, liquid crystal molecules directly above the strip-like electrode units are rotated by an angle ranged from 85° to 95° in a plane parallel to the substrates, such as 90° shown in FIG. 10, while liquid crystal molecules in the remaining parts are not rotated, so that corresponding, alternating bright and dark stripes shown in FIG. 4 can be produced, and thereby, a 3D display is conducted; and when the strip-like electrode units are not energized, overall liquid crystal molecules are not rotated, and thereby, a 2D display is conducted. In summary, a changeover between the 2D display and the 3D display is realized.

A direction parallel to the aligning direction of the first alignment layer is taken as a first direction, and a direction perpendicular to the first direction is taken as a second direction (In producing process, there will be a certain angle between the two, and they are not strictly required to be perpendicular).

Figure 5:
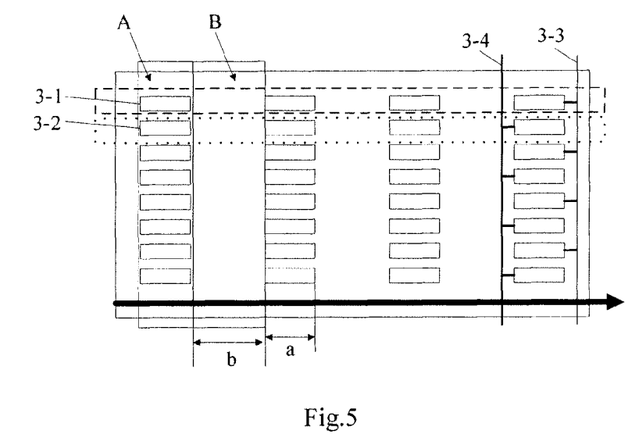
FIG. 5 is a schematic view showing a planar structure of a first substrate of a parallax barrier according to an embodiment of the invention.
Figure 6:
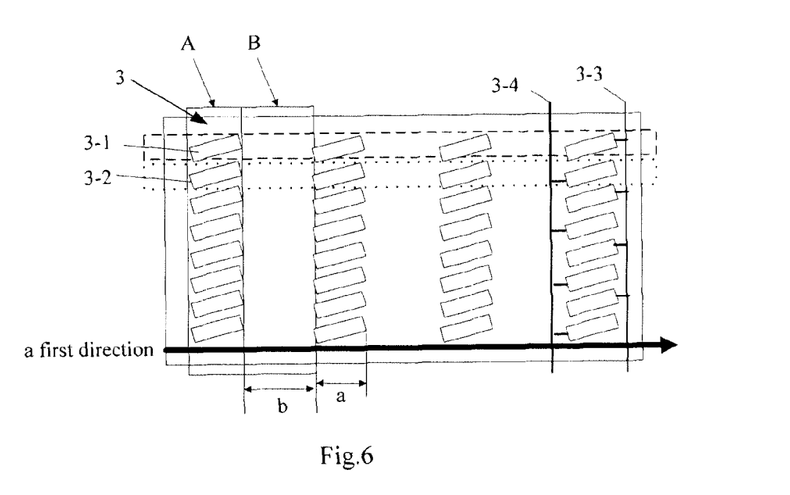
FIG. 6 is a schematic view showing a planar structure of a first substrate of a parallax barrier according to another embodiment of the invention.

Exemplarily, in order to achieve the above effects, regarding the parallax barrier according to embodiments of the invention, it may be the case where each of the plurality of strip-like electrode units 3 includes a first transparent electrode and a second transparent electrode to which different voltages are applied, and the first transparent electrode and the second transparent electrode are disposed in the same layer. The first transparent electrode comprises a plurality of first strip-like transparent electrodes 3-1 extending along the first aligning direction (as shown in FIG. 5) or along a direction that makes a preset angle with the first aligning direction (as shown in FIG. 6), and any two adjacent first strip-like transparent electrodes 3-1 of the first transparent electrode are connected to each other. The second transparent electrode comprises a plurality of second strip-like transparent electrodes 3-2 extending along the first aligning direction (as shown in FIG. 5) or along a direction that makes a preset angle with the first aligning direction (as shown in FIG. 6), and any two adjacent second strip-like transparent electrodes of the second transparent electrode are connected to each other. In the same strip-like electrode unit, the first strip-like transparent electrodes 3-1 and the second strip-like transparent electrodes 3-2 are disposed parallel to each other and alternately, any adjacent first strip-like transparent electrodes 3-1 are connected to each other through a connecting line 3-3, and any adjacent second strip-like transparent electrodes 3-2 are connected to each other through a connecting line 3-4, so that voltages on the first transparent electrode and the second transparent electrode are different upon being energized, and a voltage difference between the two electrodes is larger than or equal to a threshold voltage at which liquid crystal is rotated. Any two adjacent strip-like electrode units are separated with an area B, and within the area B, no electrode is provided or a whole piece of transparent electrode is provided, so that the area B is kept at the same electric potential in its entirety, and liquid crystal molecules corresponding to the area B are not rotated.

Exemplarily, the preset angle formed between the first aligning direction of the first alignment layer and the second strip-like transparent electrodes 3-2 is ranged from 0°-60°, and the preset angle formed between the first aligning direction of the first alignment layer and the first strip-like transparent electrodes 3-1 is ranged from 0°-60°.

As regards the parallax barrier according to embodiments of the invention, because the transparent electrodes are merely formed on one substrate, during fabrication thereof, deposition of one layer of metal is decreased as compared to the prior art. In turn, the cost is reduced.

Exemplarily, because extending directions of the first strip-like transparent electrodes for different strip-like electrode units are the same, and extending directions of the second strip-like transparent electrodes for different strip-like electrode units are the same, the first strip-like transparent electrodes and the second strip-like transparent electrodes for all strip-like electrode units are parallel to each other.

Exemplarily, in order to achieve the above effects, in a parallax barrier according to an embodiment of the invention, the first transparent electrode and the second transparent electrode are disposed in different layers, and an insulating layer is provided between the first transparent electrode and the second transparent electrode. Moreover, in the same strip-like electrode unit, the first strip-like transparent electrodes 3-1 are parallel to the second strip-like transparent electrodes 3-2, each of the first strip-like transparent electrodes 3-1 of the first transparent electrode is located in a region corresponding to a gap between respective two adjacent second strip-like transparent electrodes 3-2, and it is ensured that there is no overlap between each of the first strip-like transparent electrodes 3-1 of the first transparent electrode and each of the second strip-like transparent electrode 3-2 of the second transparent electrode.

Figure 7:
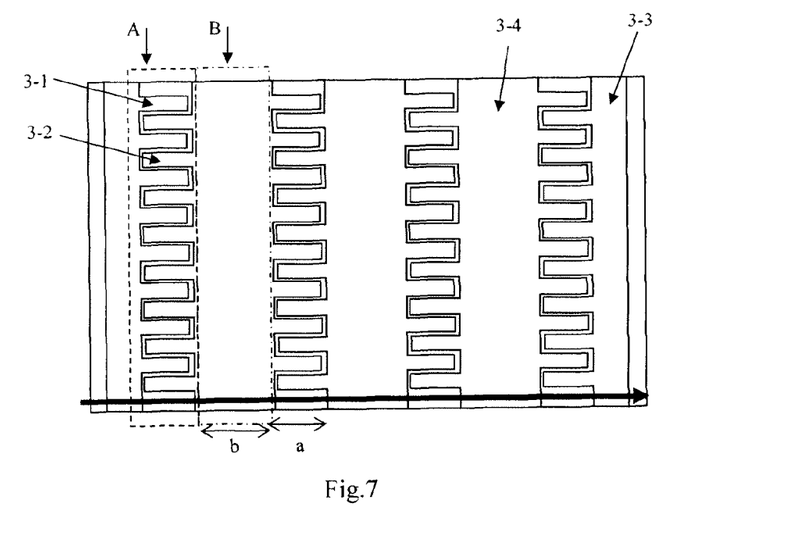
FIG. 7 is a schematic view showing a planar structure of a first substrate of a parallax barrier according to still another embodiment of the invention.
Figure 8:
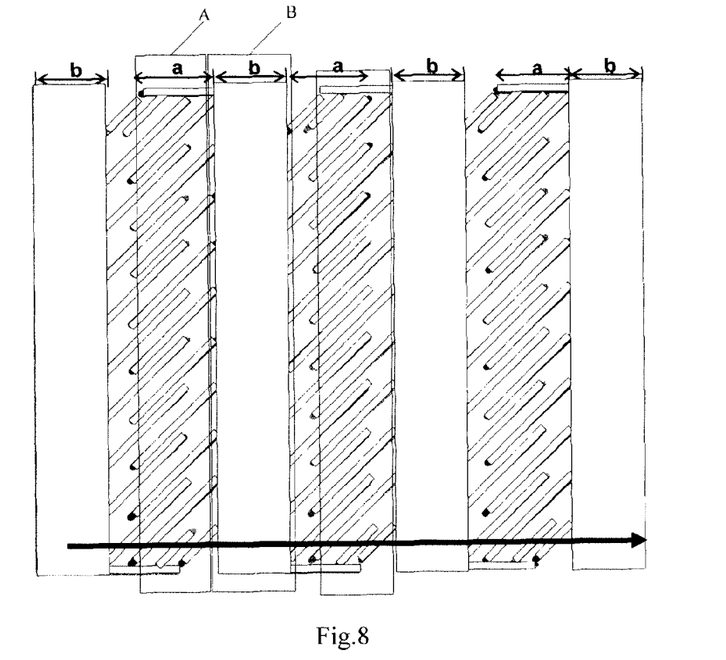
FIG. 8 is a schematic view showing a planar structure of a first substrate of a parallax barrier according to yet still another embodiment of the invention.
Figure 9:
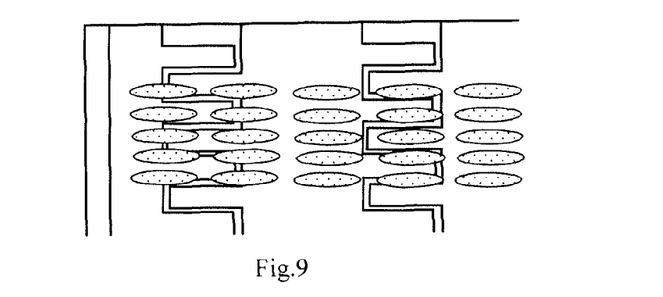
FIG. 9 is a schematic view showing the arrangement of liquid crystal when no electricity is applied to the substrate shown in FIG. 7.

In addition, as regards connecting lines between the first and second strip-like transparent electrodes (such as the connecting line 3-3 and the connecting line 3-4 in FIGS. 5 to 6), they may take a form of a metal wiring, and it may also be possible that as shown in FIG. 7 to FIG. 8, each of the first transparent electrode and the second transparent electrode is a comb-like electrode, and thus, the connecting lines are comb-tooth connecting parts by which comb teeth are connected together.

Figure 10:
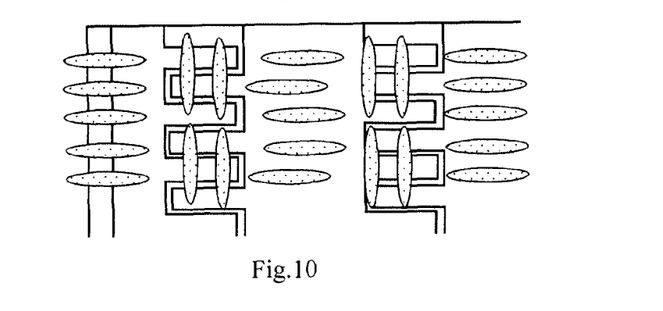
FIG. 10 is a schematic view showing the arrangement of liquid crystal when electricity is applied to the substrate shown in FIG. 7.

In the parallax barriers according to embodiments of the invention shown in FIG. 5 to FIG. 8, liquid crystal molecules corresponding to the area A will be rotated upon being energized, while voltages on the area B are equal everywhere, and liquid crystal molecules corresponding to the area B are not rotated consequently, whereby such an arrangement that is shown in FIG. 10 appears. Thus, light shielding stripes and light transmitting stripes that show an alternating pattern of bright and dark as shown in FIG. 4 are formed.

Figure 11:
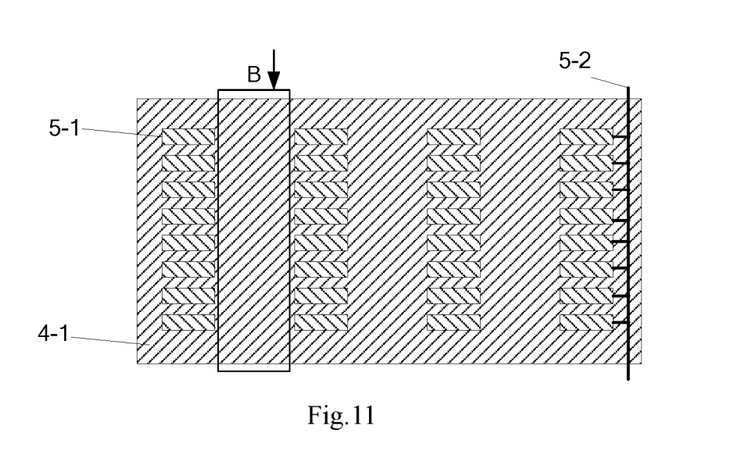
FIG. 11 is a schematic view showing a planar structure of a first substrate of a parallax barrier according to yet still another embodiment of the invention.
Figure 12:
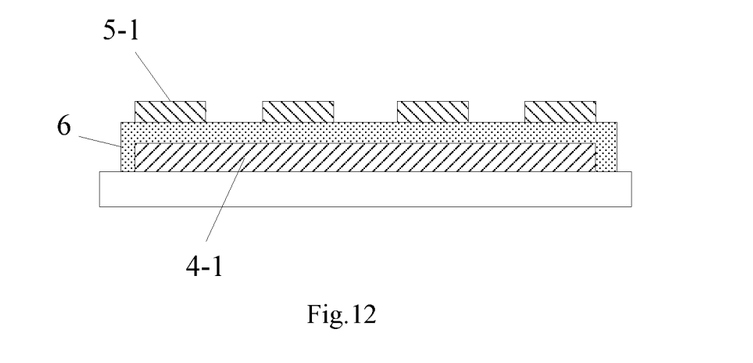
FIG. 12 is a cross-sectional view showing the first substrate of the parallax barrier shown in FIG. 11.

Exemplarily, as shown in FIG. 11 to FIG. 12, in order to achieve the above effects, regarding the parallax barrier according to embodiments of the invention, it may also be the case where the first transparent electrode is located above the second transparent electrode, namely, the first transparent electrode is closer to liquid crystal than the second transparent electrode, with an insulating layer 6 disposed therebetween, the first transparent electrode comprises a plurality of first strip-like transparent electrodes 5-1 extending along the aligning direction of the first alignment layer or along a direction that makes a preset angle with the aligning direction of the first alignment layer, and for the same one strip-like electrode unit, any two adjacent first strip-like transparent electrodes 5-1 of the first transparent electrode are connected to each other through a connecting line 5-2; the second transparent electrode is a plate-like electrode 4-1, voltages on the first transparent electrode and the second transparent electrode are different, and a voltage difference between the two is larger than or equal to a threshold voltage at which the liquid crystal is rotated.

Exemplarily, for each of the strip-like electrode units, multiple strip-like transparent electrodes of the first transparent electrode are electrically connected to each other and/or multiple strip-like transparent electrodes of the second transparent electrode are electrically connected to each other. While for the first transparent electrode and/or the second transparent electrode that include(s) the multiple strip-like transparent electrodes electrically connected to each other, the first transparent electrodes and/or the second transparent electrodes for different strip-like electrode units will be electrically connected to each other, respectively, and be jointly connected to external wiring(s), or connected to the external wiring(s) individually. A commonly-used mode may be adopted as the mode for connection to the external wiring(s), and embodiments of the invention do not set a limit to it. For example, as shown in FIG. 6, connecting lines 3-4 for different strip-like electrode units may be connected together, and/or, connecting lines 3-3 for different strip-like electrode units may be connected together. Alternatively, connecting lines 3-4 for different strip-like electrode units are respectively connected to external wirings, and connecting lines 3-3 for different strip-like electrode units are respectively connected to external wirings.

According to an embodiment of the invention, there is further provided a naked-eye 3D display device, which comprises the above parallax barrier and with which, the 2D/3D switch can be carried out. The naked-eye 3D display device comprises the above parallax barrier and a display panel, and the parallax barrier is disposed on a light exiting side of the display panel or is located between the display panel and a backlight, for achieving the naked-eye 3D display.

An example of the display panel according to the embodiment of the invention is a liquid crystal display panel, in which, an array substrate and a counter substrate are disposed in opposition to each other so as to form a liquid crystal cell with liquid crystal material filled therein. The counter substrate is such as a color filter substrate. A pixel electrode for each pixel unit of the array substrate acts to apply an electric field that controls the degree of rotation of the liquid crystal material, thereby conducting a display operation. In some examples, the liquid crystal display panel further includes a backlight source for providing the array substrate with backlight.

Another example of the display panel according to the embodiment of the invention is an organic electroluminescent display device, in which, a pixel electrode for each pixel unit of the array substrate functions as an anode or a cathode for driving an organic luminescent material to give out light, so as to conduct a display operation.

Exemplarily, the display panel according to the embodiment of the invention may also be a plasma display panel, an electronic paper, or the like, and embodiments of the invention do not set a limit to it.

As regards the parallax barrier and the display device comprising the parallax barrier according to embodiments of the invention, because two transparent electrodes are merely formed on one substrate, as compared with the parallax barrier in the prior art, it is not necessary to use a anisotropic conductive adhesive to electrically communicate the transparent electrode formed on one of the two substrates with a leading wire on the other of the two substrates, and the transparent electrodes may directly connected to the leading wire on the substrate, and thus, the cost is reduced.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:
1. A parallax barrier, comprising:
a first substrate;
a second substrate, cell-assembled with the first substrate;
liquid crystal, filled between the first substrate and the second substrate;
a plurality of strip-like electrode units, disposed parallel to each other and at an interval on a side of the first substrate close to the liquid crystal;
a first alignment layer, disposed above the plurality of strip-like electrode units and on the side of the first substrate close to the liquid crystal;
a second alignment layer, disposed on a surface of the second substrate opposed to the first substrate,
wherein, an aligning direction of the first alignment layer is perpendicular to an extending direction of the strip-like electrode units, and an aligning direction of the second alignment layer is opposite to the aligning direction of the first alignment layer,
wherein, after the strip-like electrode units are energized, the liquid crystal directly above the strip-like electrode units are rotated by an angle ranged from 85° C. to 95° C. in a plane parallel to the substrates,
wherein, there is a whole piece of transparent electrode provided between any two adjacent strip-like electrode units, the whole piece of transparent is insulated from each of the plurality of strip-like electrode units,
wherein the whole piece of transparent electrode provided between any two adjacent first transparent electrodes does not have any branches,
wherein each of the plurality of strip-like electrode units includes a first transparent electrode and is provided in an area that comprises a second transparent electrode,
wherein different voltages are applied to the first transparent electrode and the second transparent electrode,
wherein the first transparent electrode included in each of strip-like electrode units and the second transparent electrode are disposed in different layers, and an insulating layer is provided between the first transparent electrode and the second transparent electrode, and
wherein, the first transparent electrode comprises a plurality of strip-like transparent electrodes electrically connected to each other, extending directions of which are the same as the aligning direction of the first alignment layer or forms a preset angle with the aligning direction of the first alignment layer, the second transparent electrode is a plate-like electrode and is closer to the first substrate than the first transparent electrode, and the second transparent electrode is formed into a whole.

2. The parallax barrier as claimed in claim 1, wherein, a voltage difference between the first transparent electrode and the second transparent electrode is larger than or equal to a threshold voltage at which the liquid crystal is rotated.

3. The parallax barrier as claimed in claim 1, wherein, the preset angle is ranged from 0° C. to 60° C.

4. The parallax barrier as claimed in claim 1, wherein, a metal wiring is used to electrically connect the plurality of strip-like transparent electrodes of at least one of the first and second transparent electrodes.

5. The parallax barrier as claimed in claim 1, wherein, at least one of the first and second transparent electrodes are formed to be a comb shape, a comb-tooth connecting part is used to electrically connect the plurality of strip-like transparent electrodes of at least one of the first and second transparent electrodes.

6. A display device, comprising:
a display panel; and
the parallax barrier claimed as claim 1, disposed on a light exiting side of the display panel or located between the display panel and a backlight.

* * * * *